United States Patent
Sengupta et al.

(10) Patent No.: US 9,940,405 B2
(45) Date of Patent: Apr. 10, 2018

(54) AUTOMATICALLY OPTIMIZING BUSINESS PROCESS PLATFORMS

(75) Inventors: Arijit Sengupta, San Mateo, CA (US); Brad A. Stronger, Mountain View, CA (US)

(73) Assignee: BEYONDCORE HOLDINGS, LLC, San Francisco, CA (US)

( * ) Notice: Subject to any disclaimer, the term of this patent is extended or adjusted under 35 U.S.C. 154(b) by 1087 days.

(21) Appl. No.: 13/080,603

(22) Filed: Apr. 5, 2011

(65) Prior Publication Data
US 2012/0259898 A1    Oct. 11, 2012

(51) Int. Cl.
*G06F 17/30* (2006.01)

(52) U.S. Cl.
CPC .. *G06F 17/30914* (2013.01); *G06F 17/30312* (2013.01); *G06F 17/30371* (2013.01); *G06F 17/30572* (2013.01)

(58) Field of Classification Search
CPC ......... G06F 17/30914; G06F 17/30312; G06F 17/30371; G06F 17/30572
USPC ........ 707/640, 804, 723, 726, 732, 728, 690
See application file for complete search history.

(56) References Cited

U.S. PATENT DOCUMENTS

| | | | |
|---|---|---|---|
| 6,059,724 A | 5/2000 | Campbell et al. | |
| 6,132,724 A | 10/2000 | Blum | |
| 7,720,822 B1 * | 5/2010 | Sengupta | 707/690 |
| 7,849,062 B1 * | 12/2010 | Sengupta et al. | 707/690 |
| 7,873,567 B2 | 1/2011 | Eder | |
| 8,489,360 B2 | 7/2013 | Lundeberg et al. | |
| 2001/0027455 A1 | 10/2001 | Abulleil et al. | |
| 2002/0095260 A1 | 7/2002 | Huyn | |
| 2003/0088320 A1 | 5/2003 | Sale | |
| 2003/0167229 A1 * | 9/2003 | Ludwig et al. | 705/40 |
| 2005/0144042 A1 | 6/2005 | Joffe et al. | |
| 2006/0155410 A1 | 7/2006 | Yamartino | |
| 2006/0233876 A1 | 10/2006 | Jamerson et al. | |
| 2007/0118391 A1 * | 5/2007 | Malaney et al. | 705/1 |
| 2007/0294422 A1 | 12/2007 | Zuckerman | |
| 2008/0177643 A1 * | 7/2008 | Matthews et al. | 705/30 |
| 2009/0276467 A1 * | 11/2009 | Scholtes et al. | 707/640 |
| 2010/0324945 A1 | 12/2010 | Hessing | |
| 2011/0288660 A1 | 11/2011 | Wojsznis et al. | |

OTHER PUBLICATIONS

"Free Java Software for Data Analysis and Presentation," Jun. 9, 2003, "How to Plot Waterfall Chart," http://www.jfree.org, JFree'2003, 7 pages
PCT International Search Report and Written Opinion, PCT Application No. PCT/US12/31685, dated Jun. 20, 2012, 14 pages.
PCT International Search Report and Written Opinion, PCT Application No. PCT/US16/24576, dated May 6, 2016, 9 pages.

* cited by examiner

*Primary Examiner* — Shahid Alam
(74) *Attorney, Agent, or Firm* — Fenwick & West LLP

(57) ABSTRACT

Business process provider(s) process client data. The clients use certain formats (client formats, defined by client format fields). The client format fields instantiated in documents are analyzed. Based on this analysis, the client processes are automatically grouped into different process platforms for processing. For example, similar client processes preferably are grouped together into the same process platform, in order to increase efficiency of processing. In another aspect, the user interfaces used by the business process provider(s) may be constructed from different blocks, where the blocks are automatically defined based on the analysis of client format fields.

25 Claims, 4 Drawing Sheets

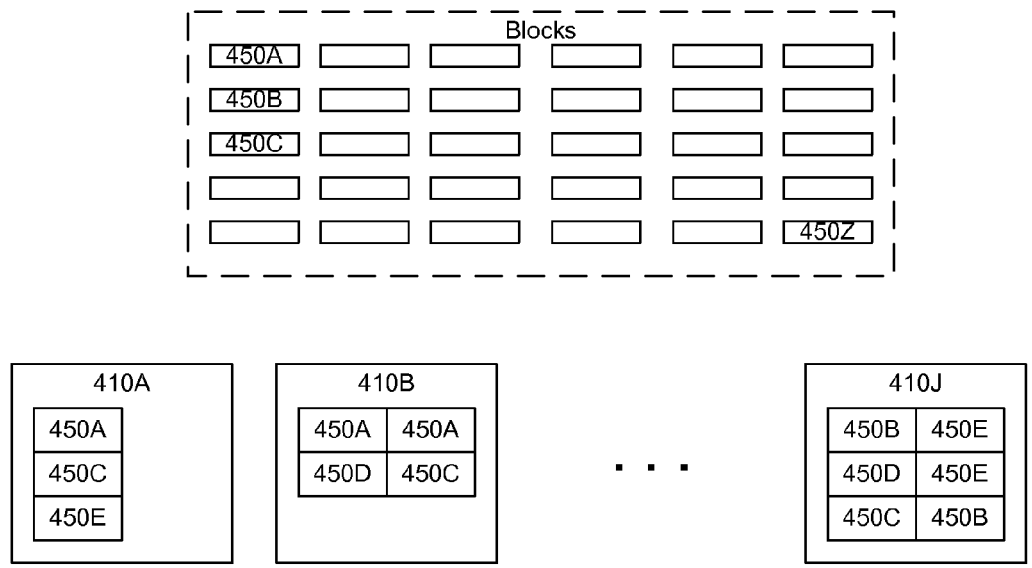
FIG. 4
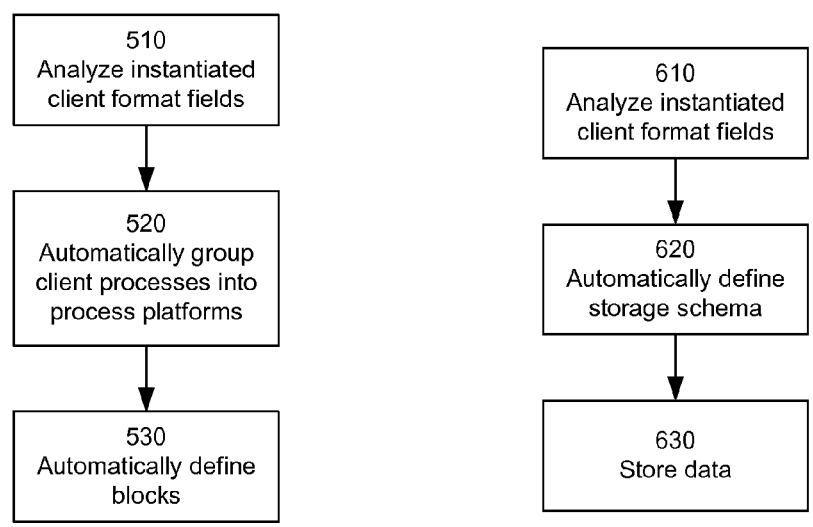
FIG. 5
FIG. 6

AUTOMATICALLY OPTIMIZING BUSINESS PROCESS PLATFORMS

BACKGROUND OF THE INVENTION

1. Field of the Invention

This invention relates generally to document processing by service providers.

2. Description of the Related Art

Business process providers provide data processing of documents for their clients. They are increasingly trying to serve customers from a consolidated process platform. Traditionally, if they were processing invoices for five different customers, they would maintain five different teams trained in each customer's unique invoice process and each of these teams would work on invoice entry systems which are specific to that customer. This can be inefficient because each team typically is trained differently, each software system typically is maintained separately, and each team typically maintains separate pools of excess labor to deal with high volume situations (peak capacity).

As a result, business process providers may attempt to realize efficiencies by serving multiple customers using the same team and the same software. An associated trend is the development of business process as a service (BPaaS). Here too, BPaaS providers may attempt to realize efficiencies by providing a single process platform to multiple clients with similar but not identical client processes and data formats.

One inhibitor to this approach is that different customers typically have slightly different flavors of the same process. Thus, customer A's invoicing format may differ from Customer B's invoicing format in minor ways, but in ways that prevent the same process from being used for both customers. To address this, the business process provider might create a standardized format (e.g., a standard invoicing format) to be used with all clients and then map each of the fields in the different client formats to corresponding fields in the provider's standardized format.

However, this mapping is typically created manually by expensive skilled professionals. Moreover, if any client process or client format changes, for whatever reason, the mapping between the fields has to be manually updated by the experts. The same is true if the provider format changes, for whatever reason. The situation is compounded as the number of different client formats and the number of different provider formats grows, and this is expected to be the case as business process providers try to aggregate more clients and client processes.

The aggregation of clients and their data processing needs can also result in similar or related concerns with respect to storing the clients' data.

Thus, there is a need for improved approaches to business processing.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 4 is a block diagram of a user interface according to one aspect of the invention.

FIG. 5 is a flow diagram illustrating one approach to defining process platforms and blocks.

FIG. 6 is a flow diagram illustrating one approach to defining storage schema.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
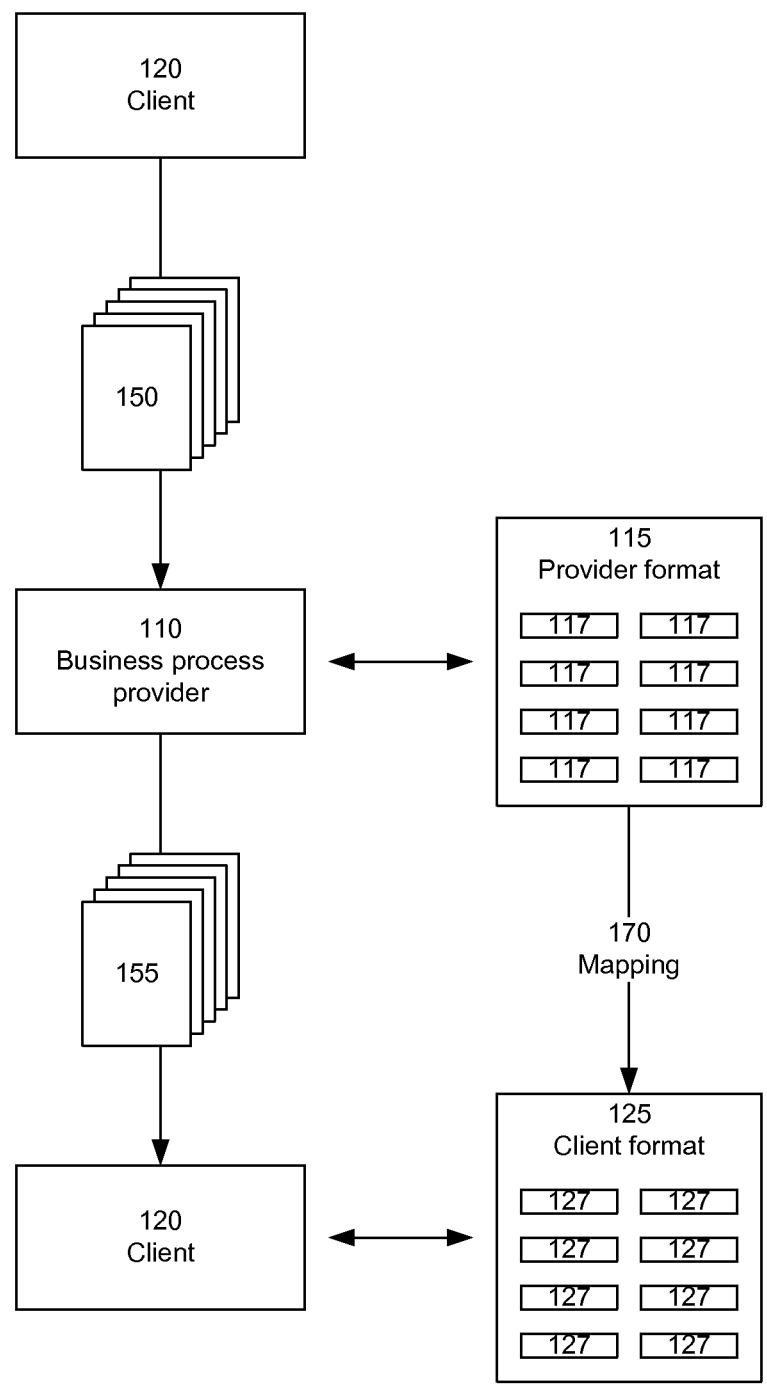
FIGS. 1A-1B are block diagrams of a system suitable for use with the present invention.
Figure 1B:
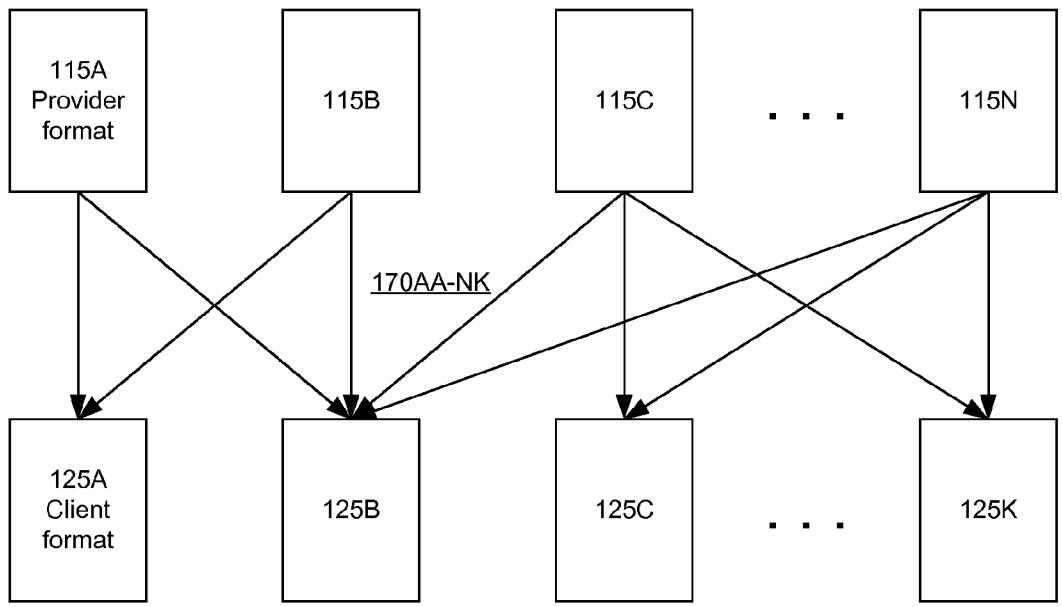

FIGS. 1A-1B are block diagrams of a system suitable for use with the present invention. FIG. 1A shows a situation where a single business process provider 110 is implementing a single client process for a single client 120. The client 120 provides documents 150 to be processed by the business process provider 110. Data processing operations include, but are not limited to, data entry, transfer, storage, reporting and transformation. The provider 110 processes these documents using the provider's format 115, which is defined by a set of fields (the provider format fields 117). The processed documents 155 are received by the client 120. The client uses its own client format 125, which is also defined by a set of fields (the client format fields 127). The client format 125 and client format fields 127 typically will be different from the provider format 115 and provider format fields 117, so there must be a mapping (or transform) 170 between the provider format 115 and client format 125. As described above, this mapping 170 traditionally is done manually, at significant expense.

For example, consider an address that might occur in a document: John Doe, 801 California St., Mountain View, Calif. 94041. The provider format 115 might represent this address using the following provider format fields 117:

Applicant: John Doe
Addr Line 1: 801 California Street
Addr Line 2: - - -
City: Mountain View
State: CA
Zip Code: 94041

The client format 125 might represent this address using the following client format fields 127:

Title: - - -
First Name: John
Middle Name: - - -
Last Name: Doe
Street Number: 801
Street Name: California
Street Type: Street
Apt: - - -
City: Mountain View
State: CA
Zip Code: 94041

The mapping 170 converts between provider format fields 117 and the corresponding client format fields 127. Note that the mapping does not have to be 1:1.

Note that some of the fields above are blank. Those fields exist in the format, but they are not instantiated in this particular document. For example, the field "Addr Line 2" exists in the provider format but it is not instantiated in this particular document, although it might be instantiated in other documents. There are many reasons why a field may not be instantiated in a document or even in many documents. For example, the field may be an obsolete field that is no longer used but is still part of the format. As another example, the field may be one that by its nature is rarely instantiated.

FIG. 1B shows a situation where multiple provider formats 115A-N and multiple client formats 125A-K are being used. There are now multiple transforms 170 between different pairs of provider formats 115 and client formats 125. The number of transforms increases rapidly with the number of provider and client formats. A change in one of the formats will require the adjustment of many different mappings 170.

Figure 2:
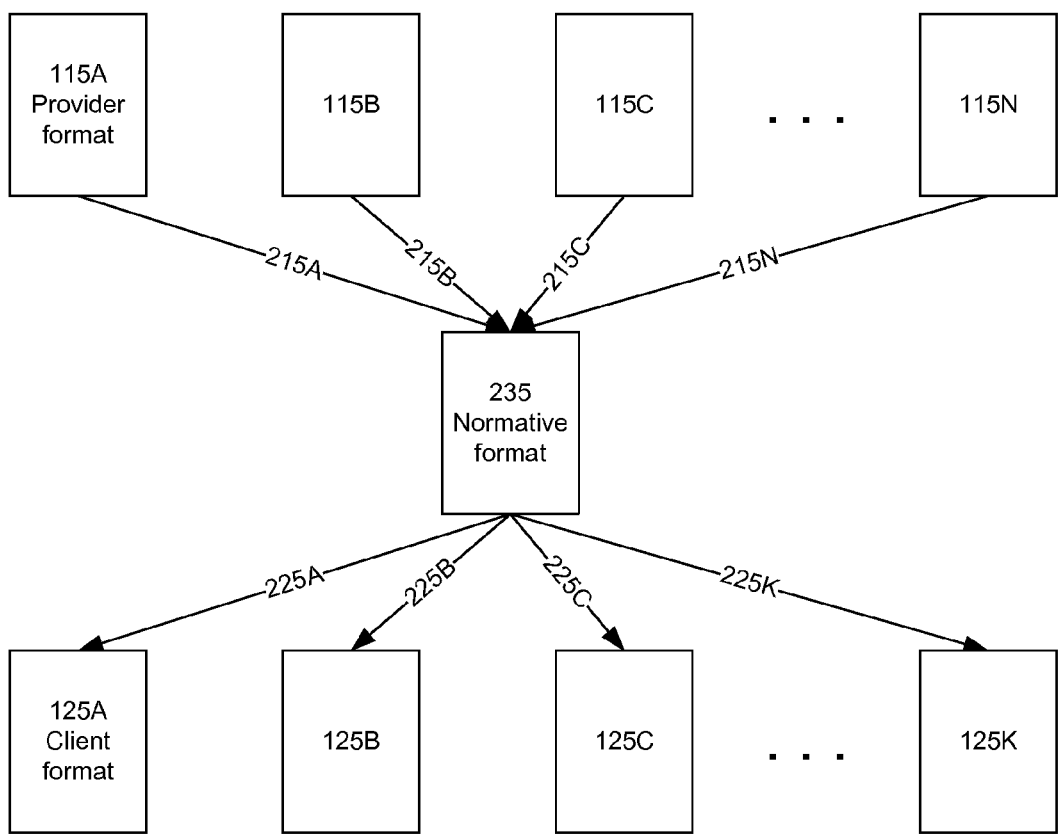
FIG. 2 is a block diagram according to one aspect of the invention.

FIG. 2 is a block diagram according to one aspect of this invention. In FIG. 2, an intermediate format (the normative format 235, which is defined by normative fields) is used to facilitate mappings between the provider formats 115 and the client formats 125. There are mappings 215A-N between each provider format 115A-N and the normative format, and there are also mappings 225A-K between the normative format and each client format 125A-K. The mapping between provider format 115 and client format 125 can be constructed based on the corresponding provider-normative mapping 215 and normative-client mapping 225. Note that the provider formats and client formats can be generated from any number of providers, clients and client processes.

One advantage of this approach is that a change in any one of the formats could be handled by a corresponding change in only a single transform (specifically, the mapping between the normative format and the changed format). For example, continuing the example above, assume that all of the documents being processed have addresses that occur within the United States, so that none of the provider or client formats has a "Country" field—consistent with the address example shown above. Now assume that one of the clients starts to do business outside the United States and adds a "Country" field to client format 125B. A "Country" field can be added to the normative format 230, the mapping 225B adjusted accordingly, and the other client-side mappings 225 remain the same.

Another possible advantage, as described in more detail below, is that the normative format 230 can be automatically defined and the transforms 215 and 225 automatically determined, based on documents being processed by the system. In one approach, the normative format is an optimized subset of all of the client format fields defining the client formats. The subset can be optimized using different algorithms and with respect to different metrics, as will be further described below. For example, it might be optimized based on processing costs, training costs, or storage costs (assuming data is stored in the normative format) for the business process providers. It may also be automatically defined, based on actual client format fields instantiated, actual provider format fields instantiated, or on an analysis of data storage schema.

Consider the client-side transforms, although a similar approach can be used for provider-side transforms. In one approach, the normative format is automatically defined based on an analysis of client format fields that are actually instantiated in a set of documents. The normative format preferably is generated automatically to capture all client format fields that are actually instantiated in the documents. Client format fields that are not instantiated may not be included in the normative format, although they could be if so desired. For example, the normative format might also capture fields from obsolete client formats even though no such fields are instantiated in the current document set.

Figure 3:
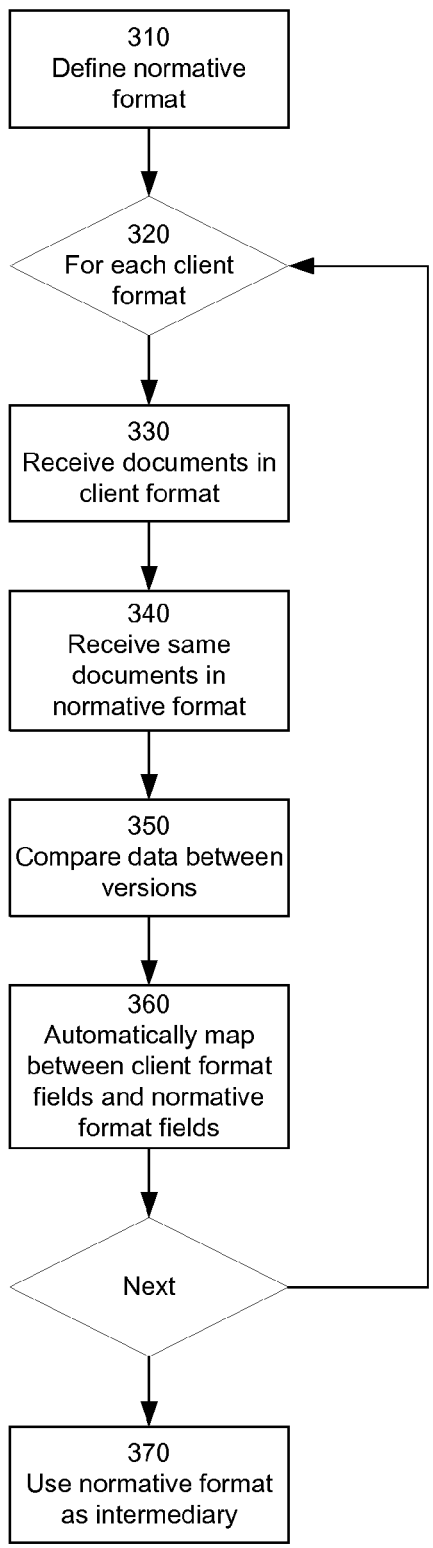
FIG. 3 is a flow diagram illustrating one approach to mapping between client formats and a normative format.

FIG. 3 illustrates one approach to automatically generate the mappings. A computer system automatically defines 310 a normative format based on analysis of client format fields instantiated in a set of documents. The computer system also maps between the normative format and each of the client formats 320. The computer system receives 330, 340 versions of documents in the both the client format and the normative format. Based on comparing 350 data in corresponding versions of the same document, the computer system automatically maps 360 between client format fields and normative format fields. As described above, the normative format is used as an intermediary 370 for mapping between the provider formats and the client formats. Mappings can be based on special data injected into the system (i.e., by creating "synthetic" documents) and/or by observing the data that naturally occurs in actual documents provided by clients. It is also possible to use a combination of these methods. For example, a partial mapping may be created using client-provided documents, with synthetic documents used to complete the mapping for the remaining fields.

In an alternate approach, the computer system observes the same set of data in both the client format and the provider format, and then automatically maps between client format fields and normative format fields based on a comparison of data in these two formats. The computer system may also determine the normative format based on the observed data.

If we wish to use only naturally occurring data, a small number of documents may not provide enough information to create a complete transform. There are several reasons why this might be the case. One possible scenario is an invoice process where the client's middle initial has been left blank on every document. Because the field is not instantiated in the sample document set, the software cannot automatically figure out which location in the normative format should map to the "Middle Initial" field in the client format. Another scenario occurs when the billing and shipping addresses are identical, and the software cannot unambiguously determine the mapping.

Yet another scenario where a small number of documents are insufficient to create a map may occur when the operator processing a document makes an error. For example, if the sales tax is incorrectly entered into the "Freight Amount" field on one document, the software would find that there is no possible single map which correctly maps each and every document to the normative format correctly. In these cases, we can use a plurality voting scheme to determine what is most likely the correct mapping. We can use the plurality voting methodology explained in U.S. Pat. No. 7,844,641 (which is hereby incorporated by reference) to figure out that, for example, in the vast majority of cases, the data in field 1 of the client format 1 accurately maps to field A of the normative format, and that the few cases where the data in field 1 actually mapped to field B of the normative format were just instances of human error.

After one or more documents have been analyzed, the software can provide a status report to the user. It may indicate a complete transform, or it may indicate that it needs more information. The software can also report which items of information it needs to complete the transform. For example, it could report that it cannot determine whether the "Middle Initial" field is recorded in the client format, because that field has been left blank in every document it has seen. In another example, it could report that it cannot determine which of "Billing Address" and "Shipping Address" in the provider format maps to "Address" in one client format, as those fields have been identical to each other in every document available for analysis.

The software may automatically suggest elimination of redundant or unnecessary fields in a client or provider format. For example, if a field is always blank, the software may recommend that this field be eliminated from the client or provider format as the case may be. Similarly, if the "Billing Address" is always identical to the "Shipping Address," it may recommend combining these two sets of fields into a "Billing and Shipping Address" field. Now, if the underlying business process is such that these two addresses will always be similar because the system only allows a user to ship to their billing address for example, then a human user may accept such a recommendation. Alternatively, the system may even be allowed to temporarily eliminate or consolidate such fields automatically until it encounters a situation where the eliminated field is not blank or the two consolidated fields/sections are not identical. Then the software can treat the situation the same way it would handle the introduction of a new field in that specific format.

The vast majority of formats are designed to accommodate all possible scenarios rather than the most common ones. Formats often also include legacy fields that are almost never filled out. For example, many documents may still contain a "Telex" field which is almost never filled out. In traditional methods, all of these fields are considered while doing mapping exercises, whether or not there is a reasonable probability that these fields may ever end up being encountered in practice.

In an alternative approach, the software inspects the data already provided in the various formats (i.e., the actual fields that are instantiated) and analyzes which fields are specified most of the time and which fields are usually or always left blank or always or almost always, contain the same default data. Then, while creating the normative or provider formats and the transforms, the software only considers the fields that are usually filled out. If and when the software encounters a document which actually contains a field that had been ignored and the field is not blank or does not contain the default value, then the software automatically adjusts the normative format and if necessary the provider formats and the corresponding transforms to accommodate the new field. This can also allow for the creation of data repositories whose structure and data transforms are based on the actual data stored in the repository rather than the meta-data of what could be stored in the repository.

The software may become aware of instances of fields that had been previously ignored via multiple different means. Some of these include the following:

A human operator may be provided a way to specify cases where they encountered a field in the document for which there was no corresponding UI element. This could be implemented by a standard {Other field, Field Name, Field Value} user interface.

A first pass Optical Character Recognition (OCR) software may look for cases where ignored fields are not blank or do not contain the default value. OCR is more accurate when it is given targeted/constrained tasks such as identifying whether a field is blank or has specified values than it is when OCR is generally used to recognize random unconstrained text.

In an alternate embodiment, the software may deal with fields that rarely occur (including obsolete fields) in a different manner, and not include them in the normative format. This way the majority of the data repository, formats and transforms do not need to be modified to reflect these rarely occurring fields but specific documents are tagged as having additional fields that are not included in the main repository but could be looked-up and included in an augmented client or provider format when the document is accessed in the client or provider formats.

In another embodiment, the normative format includes a common portion and one or more specialty portion(s). The common portion includes normative format fields that map to all client formats, whereas the specialty portion(s) map to only certain subsets of client formats. For example, common address fields might be part of the common portion; whereas unusual address fields that are used by a few client formats and then only rarely might be implemented by specialty portion(s).

In cases where ambiguous fields are not or cannot be eliminated or combined, these mapping uncertainties can be clarified manually. This significantly reduces the manual labor involved as only a small subset of the fields is manually mapped.

However, it may be more convenient to automatically construct a synthetic "clarifying" document which, if provided in each of the formats being analyzed, could be analyzed by the software to unambiguously map the remaining fields. If the software has access to the raw image files which operators use to enter the documents into the system, the software can automatically generate this clarifying document.

There are multiple ways that this clarifying document can be generated. Under one possible method, the software could modify an image of an existing document, adding unique data in the locations corresponding to the uncertain fields. Another method would be to "blank out" all of the existing data on the image with an opaque white box before adding the unique clarifying data. Yet another would be to start with an image of an unfilled document.

It is also an option for the user to create a single synthetic document, referred to as a "distinguisher document," which has unique data in all fields. If this distinguisher document is entered in both formats, the software will not need any more information. A typical data processing operator could fill out the information in the distinguisher document in the relevant format. Thus, instead of requiring hours or days of effort from an expensive data mapping expert, the only labor required to enable the map would be just a few minutes of an inexpensive data processing operator's time.

If the process is complex, or the low-cost operator is expected to make errors, trial mappings between two formats may be generated based on each document as provided in the formats being mapped. The plurality voting methodology explained in U.S. Pat. No. 7,844,641 (incorporated herein by reference) could then be used to automatically construct the most accurate plurality vote version of the trial mappings and this would be selected as the final mapping. For example, different operators may process a distinguisher document to produce a corresponding version. Each of these corresponding versions can be used to determine a trial mapping of the entire format. These format-level mappings may be different, and the plurality vote approaches would dictate that the map that occurred most often would be selected as the mapping.

In addition or independently, the plurality voting methodology could also be used at the field level. That is, trial field mappings between fields could be determined, with plurality vote used to select among the different trial field mappings. For example, if six tentative maps indicate that Provider Field A maps to Client Field 7, and one tentative map indicates that Provider Field A maps to Client Field 12, we could assume that the most common map is the correct map.

In an alternate approach, multiple operators may be asked to fill out the information in the distinguisher document in the relevant format. The plurality voting methodology could then be used to automatically construct the most accurate plurality vote version of the distinguisher document in the relevant format. For example, if six operators enter "cat" for a field, and one operator enters "dog," we select the correct answer is "cat" and build a map based on that.

This plurality vote approach could be further enhanced via statistical, pattern-based, learning based approaches, for example as described in U.S. Pat. No. 7,844,641. Other approaches can also be used to select between different trial mappings.

The format transformations are created automatically by "observing" the inputs and corresponding outputs of the data processing. In one approach, a document with each of the fields populated with the unique data in the distinguisher document is processed by the system. By analyzing where each of the unique data items appears in each of the stored data formats, the computer system can separate the "data" portion of the record from the "formatting" portion. The normative format could be used to provide storage for each datum, with the information about the formatting of the client and provider formats stored in the transforms.

For example, if the data is stored in XML format, we might see a snippet such as "<First>John</First><Last>Smith</Last>" in the client format version. For the same document, the provider format version may contain the snippet "<Name1>John</Name1><Name2>Smith</Name2>". Given a sufficient quantity of data, the software can determine that "John" and "Smith" are information, and the rest is formatting.

In one approach, the data is stored in the normative format, and the particulars of the formatting text will be stored in each transform. In this example, the provider transform would indicate that the information between the "Name1" XML tags should be extracted and stored in a particular location in the database. The client transform would indicate that the data in that particular location should be output inside a set of "First" XML tags. Here XML is merely used as an example. A similar process could be undertaken for data stored in a database or for any structured or unstructured data.

In some storage schema, for example HTML, the same information may occur in different locations in the document. Additionally, there may be HTML tags which do not contain relevant information. The transform from the provider format to the normative form preferably takes this into account. By analyzing a sufficient quantity of data, the computer system can discover that a given tag always contains information that is in the format of an ID number, or a single word that is always either 'Male' or 'Female', or a multi-word phrase with a specific structure, etc. Using this information, the computer system can decide if that tag contains relevant information or not and potentially what is the nature of that information. By leveraging pattern detection algorithms, or data base lookups, or analyzing the results of a search engine query with some of these data elements, the software may automatically figure out what each such datum actually means (i.e., automatically discover the meta-data). For example, even if the address section is not separately tagged, by observing enough examples of addresses, the software could learn that a specific combination of specific types of data elements usually indicate that the overall data is an address.

It is worth noting that the data fields do not require a "one to one" correspondence between the fields in provider, normative and client formats. "One to many," "many to one," and "many to many" transforms can be automatically captured using this process. For example, a provider may store an entire name (first, middle, and last name) as one item. If one client requires first and middle name as one item and another client requires middle and last name as a different item, this is not a problem.

There are many ways to learn the provider and client formats. As described below, one way to learn the provider format is simply for the computer system to generate the provider format itself. However, this is not always an option, and almost never an option for client formats. Other ways include the software user describing the format to the software. This could be done using an input screen, or uploading a document or a set of database records describing the format.

However, it may be more convenient for the software to determine the formats automatically. One way to learn the formats automatically is for the software to analyze the database records in which the data is stored. By analyzing several documents, the software can determine the name and other properties of each field. Some other properties include the type of the data (text, number, multiple choice), the default value if the operator does not interact with the user interface, and the value that the operator types if the field is left blank on the document. As described above, the software can essentially auto-discover the necessary meta-data given sufficient documents.

Once a new client format and mapping have been learned, the normative or provider formats may require modification. One method would be to remove all old mapping information and repeat the entire mapping process starting from the beginning, but including the new version of the client format. While this would work, it can be less costly to leverage the existing mapping information and have the software automatically determine the change in the format. Because we already know the old map, we can simply check which transform rules still apply, rather than searching for and generating each one from scratch. For example, if a "Reason Code" is added to a medical billing process, the existing map can be modified with this additional transform rule rather than creating an entirely new map. This will cut down on the amount of user interaction and data entry required to modify a format. Similar approaches can be used to accommodate any changes in client and/or provider formats, including adding, deleting or modifying a field in an existing format, and adding, deleting or modifying entire formats.

Another aspect is the generation of recommended user interfaces for the provider, as shown in FIG. 4. In one approach, different user interfaces 410A-J may be used by the provider for different client processes, but the user interfaces are constructed from one or more "blocks" 450A-N. A block is a component for a user interface designed to allow an operator to enter or process a set of fields. For each document that an operator enters, the user interface is constructed from an appropriate set of blocks such that each field present on the document is present in the blocks. The same blocks may be reused for different documents. Therefore, not all blocks may be used for a particular document and there may be block fields which do not exist in the specific document or type of document being processed. In FIG. 4, user interface 410A is constructed from blocks 450A,C,E. User interface 410B is constructed from blocks 450A,C,D. User interface 410J is constructed from blocks 450B,C,D,E.

For example, there may be a block for "Address." Every process where the document contains an address will show the "Address" block to the operator, who will only need to be trained on how to enter addresses once. Even if two processes have slightly different address formats, it may still be optimal to use the same address block. For example, if the addresses on one process contain an additional "Suite Number" field, that field can be added to the "Address" block. When documents for other processes are entered, that "Suite Number" field would be left blank. The same block can also be used multiple times on a document, for example if there were more than one address on a document.

Furthermore, operators may specialize by blocks, rather than by processes. One team of operators may be trained at entering addresses, and another team of operators trained at entering billing codes. Documents from any number of processes could be displayed to the operator by the system, alongside their familiar block(s).

In one approach, the computer system automatically decides how to split the observed instantiated fields into blocks. As shown in FIG. 5, the computer system analyzes 510 the client format fields that are instantiated in a set of documents. The client processes 520 are automatically grouped into process platforms, as described above. Blocks are defined 530 based on the analysis of the instantiated client format fields. The computer system may execute only when the set of client processes changes. Therefore, a given process for a given customer will use the same set of blocks, which means that an operator would interact with the same UI screens and would go through similar processing actions for each document.

If two client processes are similar, it may be advantageous to use the same block(s) for both. For example, this could involve using the same block or same collection of blocks for loan applications for two different clients, or perhaps for invoices and claims for the same client if subsets of the documents are similar. On the other hand, if two processes are very different, it would probably not be optimal to use the same block for both, as this block would have to contain all the fields seen in either process. A good compromise might be a "core block" containing the intersection, and several "specialty blocks" containing the differences.

In deciding how to "block up" a set of processes, attention might be paid to training costs and labor costs. The more unused fields an operator must enter or consider and then leave blank, the more labor is consumed. However, having a very diverse set of process-specific blocks requires more training At one extreme, if labor is considered free, we would have one large block containing every field from every format. This would require only one training for all operators, but a significant amount of labor would be unnecessarily consumed. At the other extreme, we could have a custom built block for each process and each customer. Labor would be optimized, but the training would be process specific. Moreover, if trained operators are not easily available, the employer may have to maintain a "bench" of process-specific trained operators so that the benched operators can take over as existing operators become unavailable. In fact, this extreme case is what is done today when a business process provider designs and executes a unique process for each client.

Some approaches to solving the problem of how to block up processes include the costs/weights approach, the feedback loop approach and the self-learning approach.

In the costs/weights approach, if the user provides the costs (or relative weights) of these various factors, an optimum can be determined by the computer system. The effort required to enter each field is described, as well as the amount of effort to skip an unused field. The effort to create different trainings for different versions of blocks, as well as the cost and frequency of training, is also described. The user also describes the rate at which each of the documents is processed. Based on these factors, the computer system can calculate a suggestion for the optimum combination and size of blocks. Other similar factors may be considered by the software while creating the optimal block scheme. Because some of these costs can be hard to quantify, some of them may be left unspecified but in those cases the selection of blocks would be less optimal.

One possible implementation of the costs/weights approach is described here:
Inputs:
  Set of all processes, each described as a set of fields
  For each field in every process
    Cost to process the field
    Cost to skip the field if it does not exist in a document
  For each process
    Transaction volume (documents processed/day)
  Training costs
    Cost to train one block, as a function of block size
    Rate at which training must be performed (how often do we need to train operators on average which is a function of training retention rate, operator churn rate, and other factors.)
Metric:
  Define a metric M. The metric is the cost rate (average money spent per unit of time) of processing documents for all processes.
  For a given blocking structure B, the metric M(B) is equal to the sum of training costs and labor costs across all processes under that blocking structure. Because we look at M(B) across all the processes, we would automatically optimize the blocking structure more towards the processes that have more transaction volume or somehow have a proportionally greater impact on training costs.
  The total training cost is equal to the sum of the training cost for each block, multiplied by the training rate.
  To calculate the labor cost for a single process, consider the blocks that an operator interacts with for that process. The cost is equal to the processing cost of each field in that document, plus the skipping cost of each field shown in a block, which is not in this process.
  The total labor cost is equal to the sum of the labor cost for each process.
Process: The problem of determining the ideal blocking structure can be described as optimizing M(B) across all possible B. The set of possible B is large but finite, so one approach would be to simply iterate over every possible blocking structure and calculate M(B) for each, choosing the best one. Other approaches involve local search algorithms, such as steepest ascent and simulated annealing. One approach is as follows:

Define a trivial initial blocking structure. In this approach, we will begin with one large block containing all fields for all documents.

Define an iterative step. In this approach, we will loop through each field in every block, and calculate M(B) for each of the following structure modifications, choosing best one:

Split the field off into its own block

Move the field into each of the other existing blocks

Make no change

Iterate until no improvement can be made. Thus we have arrived at our local optimum.

In the feedback loop approach, the software provides a "feedback loop" input to the user, where the user can look at a set of recommended block structures and indicate whether it looks too training intensive or too wasteful of labor. Based on that feedback, the software can adjust the scheme until it appears optimal to the user.

The self-learning approach is another possible approach. It may be the case that the training cost and processing cost are not known or are highly variable. The error rate for a set of processes, a given process or for a given operator can enable an alternate approach to this problem. If the blocking structure is too complex, the error rate will go up. U.S. Pat. Nos. 7,720,822, 7,844,641 and 7,849,062 (which are incorporated herein by reference) describe ways in which error rates can be evaluated at the process, operator and field levels, and methods by which specific "critical fields" which have a proportionately higher concentrations of error can be identified. It is usually not difficult to determine the time taken by an operator to process a transaction. Most data processing environments retain detailed information on processing times or at the very least maintain detailed records of average throughput. If the underlying processing system includes a workflow system, then the workflow can be queried to determine the time taken to process each step.

The optimizing software can thus look at the processing time as well as the error rate and try to adjust the blocking structure such that the processing time and the error rate is minimized. A user would have to provide feedback on the relative tradeoff between speed and quality, or the software could leverage industry specific rules of thumb for such tradeoff such as "correcting an incorrect transaction costs 10 times the cost of processing the transaction correctly in the first place."

The critical fields could be further analyzed to see if the blocking structure was contributing to their higher error rates. If so, the blocking structure could be modified to reduce error rates.

The system could also test different blocking schemes by providing different blocking schemes to randomly selected groups of operators or peer-group operators (who have similar error rates and processing times when given the same UI) and test the differential impact on productivity and quality. The blocking structure could then be shifted to the blocking scheme that resulted in the lowest error rate and processing time combination. Based on operator-specific error rates and error patterns, different blocking schemes might even be employed for different operators.

These approaches can be used independently, in combination or in sequence to determine the optimization of blocks.

While blocking is a useful concept in its own right, it can also be combined with the normative format and storage schema described herein. In one approach, each block has its own map to the normative format. The provider interface may store the information into a separate database or other data repository format, and it will be transformed into the normative format by the transforms described above. Alternately, the provider interface can store records in the normative format itself Because these blocks are determined automatically, there is no need for the user to inform the computer system that two processes are "very different"—the system will determine that automatically. The blocking system may also vary by provider, depending on the typical composition of documents they process. For example, a provider that mainly processes invoices may end up with a simpler blocking system than a provider that processes invoices, claims and policies on the same platform.

The complexity of the resultant blocking system can be used to determine whether two types of processes can be profitably served from the same processing platform. For example, when a new invoice process is added to an existing platform, the software may indicate that resultant blocking structure would be too complex and that the new process should be kept segregated in a different process platform. If multiple such process platform sets are known to the computer system, it can also suggest the most optimal platform for the new process to be added to by determining which choice would generate the simplest blocking structure.

The software can also automatically analyze a set of processes (e.g., based on the instantiated fields) and group the client processes into N subsets, each handled by a separate process platform (e.g., possibly with its own normative format). In this way, within each subset the blocking structures are relatively simpler thus minimizing both training and wasted labor. The groupings can also be updated as the client processes change or as client processes are added or deleted.

It is also possible for one piece of information, if it is the same on two documents, to be stored only once in the normative format. For example, both a purchase order and an invoice can map to and from the same information. This can be used as an automatic error checking feature, or an effort saving feature. For example, when an invoice number is entered, if the corresponding purchase order has already been entered, the common fields could be automatically filled out by the system.

The system can also be easily used as the backbone for a work exchange system. Clients can submit documents to the system, and any available business process provider can attempt to complete any available work. Because each client mapping and each provider mapping is stored separately, different providers can process documents for the same client. Each provider provides the processed document in its own provider format, and the system extracts the information into the normative format, ready to be transformed into the client format.

Some clients may have a preference among providers. Certain providers may be unacceptable, while others may be more or less preferred. Analogously, providers may prefer working with one client or another.

One system to address this would be for each client to list the amount he is willing to pay, his bid, for each provider, for each outsourced business process. The providers would do the analog, listing their asking prices. The system could automatically match clients to providers in the way that creates the most synergy. For example, the system may try to always match clients to providers for whom they have the highest willingness to pay. Or it may try to match client and providers in a manner such that client is matched to the provider where they would have to pay the least. It may even try to allocate clients and providers in a manner that maximizes the differences between the client's willingness to pay and the provider's minimum price, thus maximizing the potential for the fee that could be charged to match the client with the provider.

Another option is for the client to set a minimum standard of quality for each process. He would also list his bid for that quality level. (He could optionally bid different prices for different qualities of work.) Providers could accept bids but would be required to perform at the designated quality level. The system could automatically periodically audit the providers to ensure that the quality promised is being provided.

Also, if any of the providers (in a multi-provider situation), or any of the operators is privy to restricted information, that information can be stored in a separate provider format. Also the information can be stored in a separate normative format and even in a separate physical location with different security protocols.

If document data represented in the normative format is desired to be saved, a storage schema for the normative format must be determined. There are several factors influencing the choice of storage schema. It is usually desired that the data be stored in the least amount of space required. It is also usually required that the data be able to be output in the original format when needed.

FIG. 6 is a flow diagram illustrating selection of storage schema. The client format fields instantiated in the documents is analyzed 610. A computer system automatically defines 620 a storage schema based on this analysis. The data from the documents is then stored 630 using the storage schema. The following describes several example approaches for storing this data into database tables. Each item of data has extra information associated with it: a client, a document id, a field id. The document id is generated automatically by the system to ensure uniqueness.

It may also be desirable to store a "conformant" or processed version of the data. Conformant data has been processed to conform to a norm. For example, if the capitalization is irrelevant, all data may be stored in upper case format. As another example, a United States address may be entered in many ways, but can be made to conform to the official Post Office standard format. The procedure to make the data conformant would likely be different for each field. A middle name, for example, could be made conformant by making the first letter capitalized and the rest in lower case.

It is possible to optimize the storage by simply not storing fields which are not instantiated. For example, many formats may contain a "telex" field which is never used, so then the storage schema need not include a telex field. Some documents may be as much as 70% or more blank fields. In these situations, the blank information need not take up space in the database. Instead, the map can store the information that the field is blank. If a document should ever be encountered where that field is not blank, the map and storage structure can be modified on the fly.

One method of information storage is to have a custom database table for each client. Another is to have one table for all the data. There is also a hybrid system combining elements of each. At any time, it is possible to easily shift from one storage scheme to any other. Some further examples and details are provided below.

In one implementation of one table for each client, the columns of the table represent the different data items (fields) in the document. Each row represents one document. There will also be client id and document id columns in the table. In this scheme, the data from specific clients or specific documents may be stored at a different location. There may also be additional columns to designate whether the document has been exported to client format. In order to store a conformant version of the data using this scheme, another table with the same structure as the first one can be created. It is also possible to store subsets of the conformant data at a different location.

In a scheme where all data is stored in one table, the table will have a column for each of the following: client id, document id, field id, and data itself. Each row will represent one field from one document, which is one item of data. In this scheme, the data from specific fields, as well as from specific clients or documents, may be stored at a different location. There may also be additional columns to designate whether the document has been exported to client format. In this latter scheme there may be an additional column to store the "conformant" version of the data.

In a hybrid system, some clients each have their own table as discussed in the first example above. Other clients share a one-table-for-all table, as discussed in the second example above. Clients can be automatically transitioned from their own table to the group table, or vice versa, without affecting the data transforms. If rarely-used fields, as discussed above, are to be stored separately, then the hybrid scheme would be an efficient way to do so.

There are tradeoffs between the schemes. The space efficiency differs for the two schemes. Both schemes allow for full extraction of the data, but the former scheme may be more space efficient if every field in every document is populated. If a significant portion are left blank, the tables of the former scheme may be sparsely populated and the latter scheme may be more space efficient.

The former scheme has one database table for each client. If the client's process has a maximum of F fields, there will be F+3 columns (in this particular example). Therefore each document is stored using F+3 cells, regardless of how many of the document's F fields are blank. If the number of fields is large and the documents are highly populated, then an average of slightly more than one cell is used for each field of information. There may be wasted unused pace from the unpopulated fields, but if a data type such as Variable Character Field (varchar) is used, this waste will be minimized and the table size can be brought even closer to the raw data size.

If a conformant version is stored, the space consumption doubles (in this example). This can be as little as just over twice the size of the raw data, or much higher if the documents are sparsely populated and the information is not able to be stored in a varchar-type format.

The latter scheme stores all clients' data in one table. In this particular example, the table has four columns, plus an optional conformant data column. In general, the space consumption is roughly four times the size of the data, as four cells are required for each datum. However, the three ID columns may take up significantly less space than actual client information, as integers can be stored in relatively few bytes. "Holes," or unpopulated fields in the documents, do not add to the storage load, as the corresponding rows are not generated and stored in the table.

In the latter scheme, storing a conformant version of the information does not double the data storage size. Because the conformant data is merely appended in a new column to the existing table, the ID columns can be re-used. The exact effect depends on the ratio of the data size to the size of the integers stored in the ID columns, but this is of course more efficient than a separate table for the conformant data.

In the hybrid scheme, the space efficiency for each of the two other schemes can be calculated for each client. In order to do this, it is ideal to know the number of fields, the data type of each field, and the frequency at which each field is populated. After the efficiency is calculated, the computer system can determine which scheme is more efficient for that client. That client's data can either be stored in its own table or in the group table. The client can also be automatically and transparently transitioned from one table scheme to another if the population rate or data length of the information in the document shifts significantly over time. Note that the document storage scheme is being automatically optimized over time based on the actual data stored (i.e., based on the actual fields that are instantiated), not based on which fields appear in a format.

Since the storage schema is used to store data represented in the normative format, the techniques used to define, optimize and update the normative format can generally also be applied to the storage schema. For example, the storage schema may be divided into common tables and specialty tables. Common tables store commonly occurring data from all client formats, while specialty tables store less commonly occurring data. If the normative format is divided into a common portion and a specialty portion(s), the data from the common portion may be stored in a common table and data from the specialty portion(s) stored in the specialty table(s). The division between common and specialty tables may also be made in other ways, for example based on data storage costs, processing complexity or storage efficiency. Similar storage schemes may also be employed to store client format and provider format data if so desired.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. In a situation wherein at least one client has client processes to be implemented by at least one business process provider, each client process including documents to be processed and each client process defined by a client format in which the client receives data processed from the documents, each client format defined by client format fields, the business process providers processing the documents using user interfaces, each user interface comprising blocks, a method for facilitating the client processes, the method comprising a computer system performing the steps of:
   analyzing the client format fields instantiated in the documents;
   automatically grouping the client processes into process platforms based on analysis of the instantiated client format fields; and
   for each process platform:
      automatically defining the blocks for that process platform based on analysis of the instantiated client format fields for that process platform; and
      the business process provider using the user interface comprising the blocks defined for that process platform to process documents that are grouped into that process platform.

2. The method of claim 1 wherein the step of automatically defining the blocks comprises automatically defining the blocks based on a costs weights method.

3. The method of claim 1 wherein the step of automatically defining the blocks comprises automatically defining the blocks based on a feedback method.

4. The method of claim 1 wherein the step of automatically defining the blocks comprises automatically defining the blocks based on a self-learning method.

5. The method of claim 1 further comprising the computer system performing the step of:
   automatically updating the blocks in response to documents containing newly instantiated client format fields for the corresponding process platform.

6. The method of claim 1 wherein the step of automatically grouping the client processes into process platforms depends on the block definitions resulting from such groupings.

7. The method of claim 1 wherein the step of automatically grouping the client processes into process platforms depends on a complexity of the block definitions resulting from such groupings.

8. The method of claim 1 wherein the step of automatically grouping the client processes into process platforms depends on a cost of training for the block definitions resulting from such groupings.

9. The method of claim 1 wherein the step of automatically grouping the client processes into process platforms depends on an error rate for the block definitions resulting from such groupings.

10. The method of claim 1 wherein a same block occurs more than once when implementing at least one client process.

11. The method of claim 1 further comprising the computer system performing the step of:
automatically updating the process platforms in response to a new client process.

12. The method of claim 1 further comprising the computer system performing the step of:
automatically updating the process platforms in response to a change in an existing client process.

13. The method of claim 1 further comprising the computer system automatically performing the steps of
automatically defining a storage schema for the normative format based on analysis of the instantiated client format fields; and
storing the data from documents in the storage schema.

14. The method of claim 13 wherein the storage schema only includes fields for capturing those client format fields that have been instantiated in the documents.

15. The method of claim 13 wherein the data is stored in a conformant form.

16. The method of claim 13 further comprising the computer system performing the step of:
automatically updating the storage schema in response to documents containing newly instantiated client format fields.

17. The method of claim 1 wherein each process platform includes a normative format that serves as an intermediary between the client formats and provider formats used by the business process providers.

18. In a situation wherein at least one client has at least one client process to be implemented by at least one business process provider, each client process including documents to be processed and each client process defined by a client format in which the client receives data processed from the documents, each client format defined by client format fields, wherein the business process providers process the documents using user interfaces, each user interface comprising blocks, a method for facilitating the business processing, the method comprising a computer system performing the steps of:
analyzing the client format fields instantiated in the documents;
automatically defining blocks based on analysis of the instantiated client format fields; and
the business process provider processing the documents using the user interface comprising the automatically defined blocks.

19. The method of claim 18 wherein the step of automatically defining the blocks comprises automatically defining the blocks based on a costs weights method.

20. The method of claim 18 wherein the step of automatically defining the blocks comprises automatically defining the blocks based on a feedback method.

21. The method of claim 18 wherein the step of automatically defining the blocks comprises automatically defining the blocks based on a self-learning method.

22. The method of claim 18 further comprising the computer system performing the step of:
automatically updating the blocks in response to documents containing newly instantiated client format fields.

23. The method of claim 18 wherein the step of automatically defining the blocks depends on a cost of training for the blocks defined.

24. The method of claim 18 wherein the step of automatically defining the blocks depends on an error rate for the blocks defined.

25. The method of claim 18 wherein a same block occurs more than once when implementing at least one client process.

* * * * *